(12) United States Patent
Wu et al.

(10) Patent No.: US 8,817,912 B1
(45) Date of Patent: Aug. 26, 2014

(54) PHASE-ROTATED TONE-GROUPING MODULATION

(75) Inventors: Songping Wu, Cupertino, CA (US);
Hui-Ling Lou, Sunnyvale, CA (US)

(73) Assignee: Marvell International Ltd. (BM)

( * ) Notice: Subject to any disclaimer, the term of this patent is extended or adjusted under 35 U.S.C. 154(b) by 241 days.

(21) Appl. No.: 13/274,401

(22) Filed: Oct. 17, 2011

Related U.S. Application Data

(60) Provisional application No. 61/407,275, filed on Oct. 27, 2010.

(51) Int. Cl.
*H04L 27/20* (2006.01)

(52) U.S. Cl.
USPC .......................................... 375/308

(58) Field of Classification Search
USPC .......... 375/308, 261, 295, 260, 220, 296, 340
See application file for complete search history.

(56) References Cited

U.S. PATENT DOCUMENTS

| | | | | |
|---|---|---|---|---|
| 8,290,073 | B2 * | 10/2012 | Kasher | 375/260 |
| 2004/0091058 | A1 * | 5/2004 | Tosato et al. | 375/261 |
| 2004/0223553 | A1 * | 11/2004 | Kumar | 375/259 |
| 2005/0243774 | A1 * | 11/2005 | Choi et al. | 370/335 |
| 2006/0156199 | A1 * | 7/2006 | Palanki et al. | 714/776 |
| 2009/0005101 | A1 * | 1/2009 | Matsumoto et al. | 455/522 |
| 2010/0111145 | A1 * | 5/2010 | Trachewsky et al. | 375/220 |
| 2010/0130221 | A1 * | 5/2010 | Imamura | 455/452.1 |
| 2011/0110304 | A1 * | 5/2011 | Kuchi et al. | 370/328 |

* cited by examiner

*Primary Examiner* — Jaison Joseph

(57) ABSTRACT

Systems, methods, and other embodiments associated with phase-rotated tone-grouping modulation are described. According to one embodiment, an apparatus includes a parser configured to reposition bits of at least a portion of a data word. An encoder configured to, from the repositioned bits, form i) a tone grouping and ii) a copy of the tone grouping. The apparatus also includes a modulator configured to modulate the tone grouping and the copy of the tone grouping.

18 Claims, 3 Drawing Sheets

PHASE-ROTATED TONE-GROUPING MODULATION

CROSS REFERENCE TO RELATED APPLICATIONS

This disclosure claims the benefit of U.S. Provisional Application No. 61/407,275 filed on Oct. 27, 2010, which is incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless digital communications systems may include a variety of networks and components, for example, wireless local networks, Bluetooth equipment, wireless personal area networks, and others. When operating in such wireless systems, a premium may be placed on an ability to acquire a high-bandwidth signal and to extract the information conveyed by the signal. As more content is loaded onto signals, more users may be served by these signals and more content choices may be available. Accordingly, manufacturers of communication systems, including manufacturers of both fixed stations and mobile stations, continuously seek to improve wireless networks so that a maximum number of customers can be served using a minimum of resources.

When considering modulation techniques for use in a wireless digital communication system, a system architect should generally consider criteria such as peak-to-average power ratio (PAPR). PAPR describes the relationship between maximum or peak power of a signal output by a transmitter in relation to an average power of the signal. In many instances, it may be advantageous to reduce the PAPR of a signal to reduce the dynamic range required from a power amplifier used in the wireless transmitter. This, in turn, increases the efficiency and service life of the wireless transmitter, which may assist a service provider in delivering uninterrupted wireless services to customers.

In addition to influencing the design of transmitters for use in a wireless digital communication system, the PAPR of signals that may be received may influence the design of receivers used in these systems. For example, when designing an interface of a low-noise amplifier to a receiving antenna, it may be useful to limit the PAPR of an input signal to reduce the dynamic range requirements of the low-noise amplifier. By reducing the dynamic range of the low-noise amplifier, maximum sensitivity at low signal input levels can be maintained. Thus, for various reasons, the use of communication waveforms having low PAPR can be beneficial to service providers as well as other users of wireless communication systems.

SUMMARY

In one embodiment, an apparatus includes a parser configured to reposition bits of at least a portion of a data word. An encoder is configured to, from the repositioned bits, form i) a tone grouping and ii) a copy of the tone grouping. The apparatus also includes a modulator configured to modulate the tone grouping and the copy of the tone grouping.

In another embodiment, a method includes repositioning bits of at least a portion of a data word. From the repositioned bits, forming i) a tone grouping and ii) a copy of the tone grouping; and modulating the tone grouping and the copy of the tone grouping.

In another embodiment, a device comprises a parser configured to reposition bits of a data word to generate i) a tone grouping and ii) a copy of the tone grouping. A modulator is configured to modulate i) the tone grouping and ii) the copy of the tone grouping. The modulator is further configured to: modulate the tone grouping using a first modulation function, and modulate the copy of the tone grouping using a second modulation.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with modulating signals for transmission by way of phase-rotated tone-grouping. Signals modulated as such exhibit a lower peak-to-average power ratio (PAPR), which may enable apparatuses used for transmitting or receiving such signals to reduce dynamic range requirements while realizing the benefits of phase-domain diversity. In one embodiment, a data word is parsed into tone groupings and copies of tone groupings. The tone grouping and the copy of the tone grouping may be modulated in a manner that results in diverse waveforms being conveyed through a wireless transmitter to one or more remote receivers.

Figure 1:
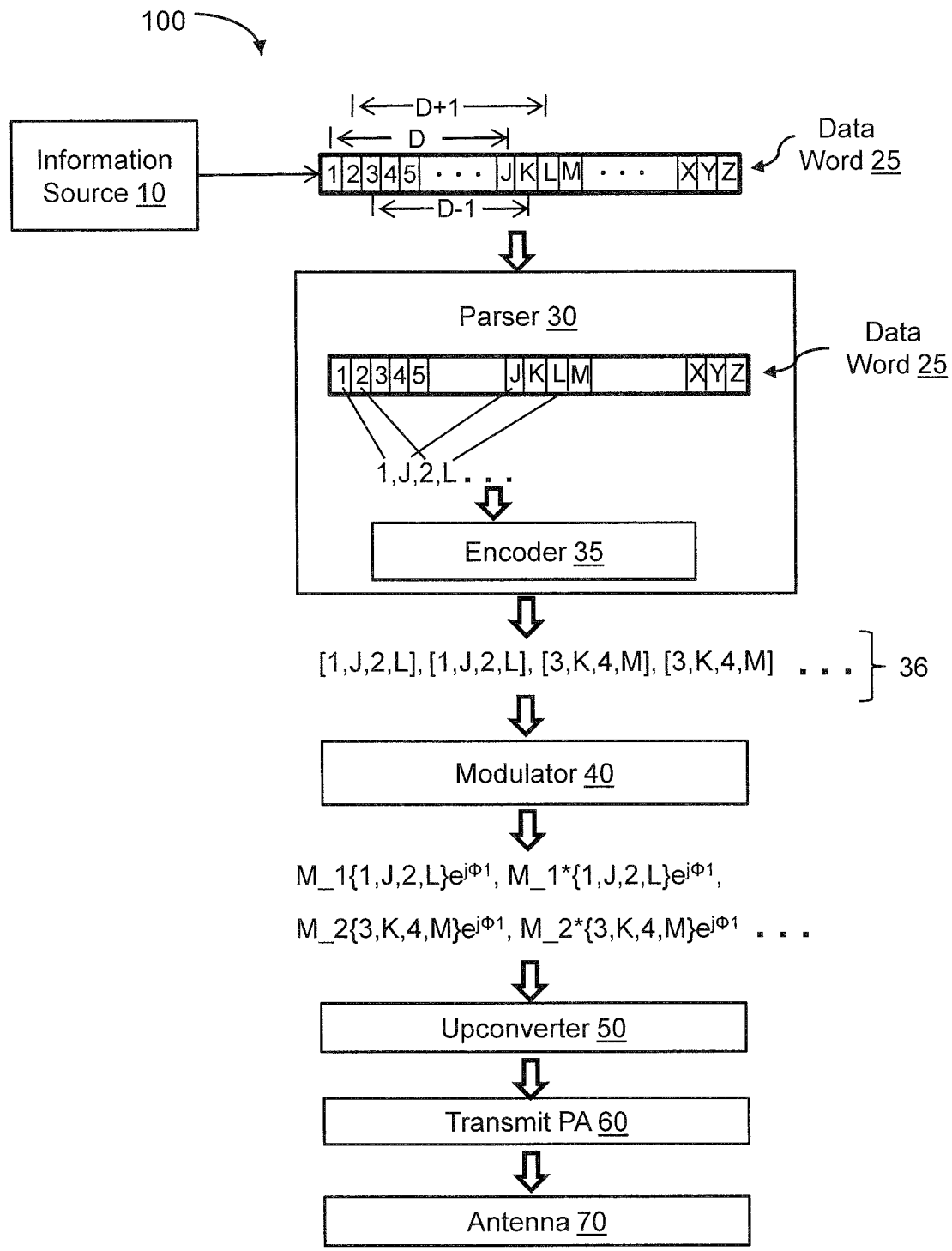
FIG. 1 illustrates one embodiment of an apparatus associated with phase-rotated tone-grouping modulation.

With reference to FIG. 1, one embodiment of an apparatus 100 is shown that is associated with phase-rotated tone-grouping modulation. In FIG. 1, an information source 10 is configured to convey a data word 25 to a parser 30. An encoder 35 within the parser 30 is configured to reposition bits of the data word 25 into smaller-sized tone groupings and to generate a copy of each of the smaller-sized tone groupings. One example of the tone groupings is designated by reference number 36. The tone grouping and the copy of the tone grouping are modulated by way of a modulator 40. The modulator 40 is configured to generate modulated signals that correspond to the tone grouping as well as generating phase-rotated modulated signals that correspond to the copy of the tone grouping. The modulated tone grouping and the phase-rotated modulated tone grouping are converted from a baseband frequency to a radio, microwave, or millimeter wave frequency by way of the upconverter 50, amplified through the transmit power amplifier PA 60, and transmitted by way of an antenna 70. The apparatus 100 may be configured for use in portable devices such as cellular telephones, handheld notebooks or laptop computers, wireless headsets, and so on. In some embodiments, the apparatus 100 may be configured for implementation in fixed-station devices such as wireless routers, cellular base stations, and so on.

In FIG. 1, the information source 10 may comprise any type of digital transmission device, such as a processor, memory controller or buffer, data bus interface, and so forth. In one embodiment, the information source 10 and the apparatus 100 are implemented in the same physical device. The information source 10 conveys data in the form of data words (e.g., the data word 25) to the apparatus 100 to be processed for wireless transmission. In the embodiment of FIG. 1, the data word 25 may comprise a fixed-length word, which may comprise, for example, 64 bits, 128 bits, or other length. In some embodiments, smaller-sized data words may be used, while other embodiments may make use of larger-sized data words. The data word 25 may also comprise a variable-length word in which each successive word may not be of a constant length. For example, a first data word may comprise 64 bits while a second data word may comprise a greater or a lesser number of bits.

For the purposes of describing the embodiment of FIG. 1, suppose the data word 25 comprises a number of bits equal to Z. Bits 1-Z are illustrated in FIG. 1. A bit distance between bit position 1 and bit position J is labeled as distance D. In a similar manner, the bit distance between bit position 2 and bit position L is labeled as D+1. In some embodiments, distance D may comprise any number, such as, for example, 1, up to the entire bit length of the data word 25 (e.g., Z), which may be 100, 200, or an even greater number. However, these are only examples and the present subject matter is not limited in this respect.

Upon receiving the data word 25, the parser 30 is configured to reposition one or more portions of the data word 25 into at least one tone grouping and to generate at least one copy of the tone grouping. Consider an example tone grouping that includes bits 1, J, 2, and L. In FIG. 1, for example, the elements of the tone grouping [1, J, 2, L] are formed by way of an encoder 35 that repositions the bits from various locations within the data word 25. In a similar manner, elements of a tone grouping [3, K, 4, M] have also been formed by repositioning various bits from the data word 25. By repositioning bits that comprise the data word 25 to form smaller tone groupings, and by repeating each tone grouping at least once, the effect of short-duration noise events, such as burst errors in a communications channel used to transmit the signals, may be minimized or at least reduced.

In one embodiment, adjacent bit pairs in a tone grouping are selected using unequal (e.g., non-constant) bit distances. In other words, the adjacent bits in a tone grouping need not be separated by a constant bit distance. For example, in the tone grouping [1, J, 2, L], the bit pair comprising bit positions 1 and J, may be separated by a bit distance D, while the bit pair comprising bit positions 2 and L, may be separated by a bit distance D+1. In the tone grouping [3, K, 4, M], a bit distance of D−1 separates the bit pair comprising bit positions 3 and K, while a different bit distance separates the bit pair comprising bit positions 4 and M.

After the tone groupings and their copies are generated by the parser 30, the tone groupings 36 are conveyed to the modulator 40. In one embodiment, the modulator 40 is configured to modulate the tone groupings using one or more modulation functions. For example, a first tone grouping, such as the tone grouping that includes the bit positions [1, J, 2, L] of the data word 25 is modulated by a first modulation function (M_1), while the copy of the first tone grouping is modulated by a second modulation function (M_2). Also shown in further detail in FIG. 2, modulator 40 may include a phase rotation module that may be selectively applied to a modulated tone grouping.

In one embodiment, the modulation of a tone grouping may result in a complex-valued function expressed as, for example, $M\_1\{1, J, 2, L\}e^{j\Phi 1}$, in which the amplitude (M_1) and the phase angle ($j\Phi 1$) are used to encode the tone grouping [1, J, 2, L] on an appropriate constellation diagram. In one embodiment, phase rotation is applied to the copy of the tone grouping, for example, which may result in a complex conjugate of a modulated tone grouping expressed as $M\_1^*\{1, J, 2, L\}e^{j\Phi 1}$, in which M_1* indicates the complex conjugate of modulation function M_1. However, other phase-related transforms may be applied.

In an embodiment, the phase rotation of the copy of the tone grouping may decrease the effects of multipath fading at a receiving end. When multipath fading is present, a reflected portion of a transmitted signal may interfere destructively (i.e. out of phase) with an unreflected portion of the signal. Thus, for example, a reflected symbol from a first tone grouping may interfere with an unreflected symbol from a second tone grouping. Accordingly, in one implementation, the copy of the tone grouping undergoes a phase rotation relative to an originally transmitted tone grouping. By performing phase rotation, a symbol from the first tone grouping may no longer destructively interfere with the same symbol from the second tone grouping, thereby mitigating the effect of multipath fading.

The outputs of the modulator 40 include modulated tone groupings and phase-rotated modulated tone groupings. The outputs are then conveyed to the upconverter 50 for conversion from a baseband frequency to a radio frequence (RF) signals, microwave signals, millimeter wave frequency signals, or other wireless form, for example, and amplified by the transmit power amplifier 60. The amplified signals are then transmitted via the antenna 70 using a communication channel to one or more receiving devices.

Figure 2:
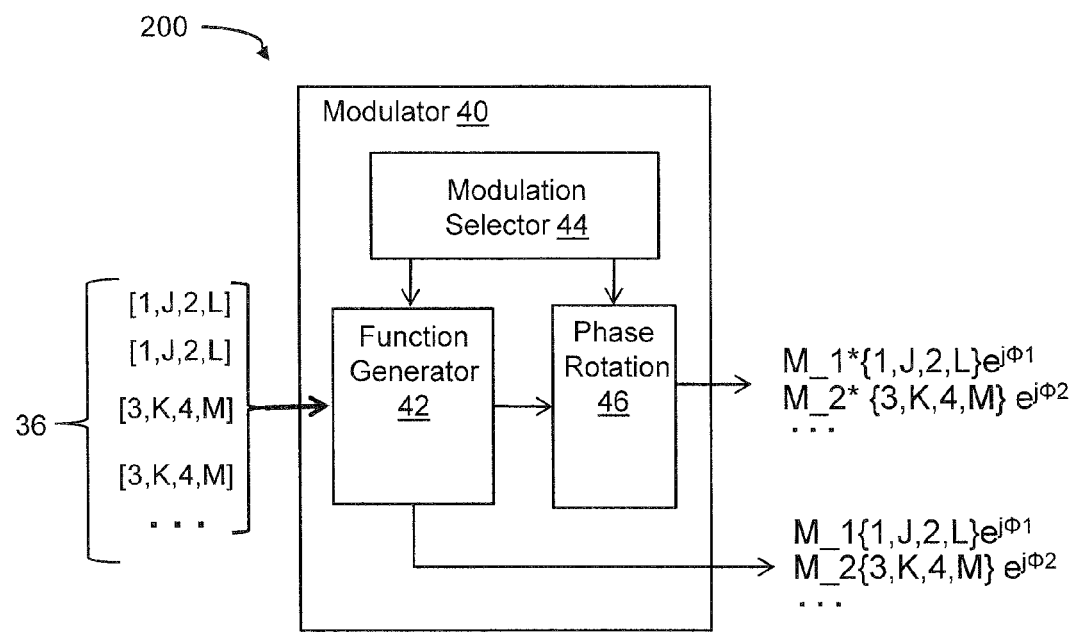
FIG. 2 illustrates one embodiment of a modulator used in an apparatus associated with phase-rotated tone-grouping modulation.

FIG. 2 illustrates one embodiment (200) of the modulator 40 shown in FIG. 1 and part of the apparatus 100 associated with phase-rotated tone-grouping modulation. In FIG. 2, the modulator 40 accepts tone groupings and copies of tone groupings 36, which are output from, for example, the parser 30 of FIG. 1. The modulator 40 includes a function generator 42 that is configured to apply one or more of various modulation functions to tone groupings. A modulation selector 44 controls the function generator 42 to apply one or more selected modulation functions from a group of available modulation functions. Example modulation functions may include quadrature phase shift keying (QPSK), in which 2 bits may be encoded into a symbol as a function of a phase relationship between a reference signal and a subcarrier of 90°, 180°, 270°, or 0°, thereby encoding 4 logic states.

In another example, the function generator 42 is configured to modulate tone groupings using 8-phase shift keying in which 3 bits may be encoded into a symbol as a function of a phase relationship between a reference signal and a subcarrier of 45°, 90°, 135°, 180°, 225°, 270°, 315°, or 0° to provide 8 logic states. In other examples, the modulation functions may include quadrature amplitude modulation (QAM) in which amplitude and phase are adjusted so that 4 bits are encoded, such as by way of 16-QAM. Other embodiment may comprise 5-bit encoding by way of 32-QAM, 6-bit encoding by way of 64-QAM, and so on.

In one embodiment, the modulation selector 44 selects modulation functions to be applied to the tone groupings based, at least in part, on the quality of a particular communications channel used to transmit signals between the antenna 70 and a receiver. For example, if the communications channel is of a particularly high quality, in which significant sources of noise and distortion are not present, the modulation selector 44 may select to apply 32-QAM to tone groupings, thereby allowing up to 5 bits to be transmitted in each symbol. In other instances, perhaps in which quality of the communications channel may be lower, the modulation selector 44 may select to apply a modulation function having additional resistance to carrier amplitude and phase errors, such as QPSK, in which only 2 bits may be transmitted in each symbol.

In at least one embodiment, a tone grouping and a copy of the tone grouping may be modulated using different modulation functions. For example, a first tone grouping may be modulated using QPSK and the copy of the tone grouping may be modulated using binary phase shift keying (BPSK). In a specific example, the tone grouping comprising bit positions [1, J, 2, L] may be modulated using 2 QPSK symbols, wherein 2 bits comprise each symbol. The copy of the tone grouping may be subsequently modulated using 4 BPSK symbols, wherein 1 bit comprises each symbol.

With continued reference to FIG. 2, the modulator 40 includes a phase rotation module 46. The phase rotation module 46 is configured to apply a phase rotation function to complex-valued modulated tone groupings. A modulated tone grouping, such as $M\_1\{1, J, 2, L\}e^{j\Phi 1}$ as previously described, may be transmitted along with a phase-rotated version of the modulated tone grouping, such as $M\_1^*\{1, J, 2, L\}e^{j\Phi 1}$, as previously described. In some embodiments, the phase-rotation function may result in the complex conjugation of a modulated tone grouping. In other embodiments, the phase-rotated function may not represent the complex conjugation of a modulated tone grouping.

With the present apparatus 100 and modulator 40, the modulation of tone groupings and a complex conjugate of the tone grouping may result in a reduction in the peak-to-average power of a transmitted signal. Accordingly, lowering dynamic range requirements of the transmit power amplifier 60 (of FIG. 1) as well as the lowering dynamic range requirements of a low-noise amplifier used in receiver circuitry may result, at least in part, from modulating a tone grouping and its complex conjugate.

In an embodiment, the phase rotation module 46 may receive a control signal from the modulation selector 44 that, at least in part, results in a selection of at least one parameter of the phase rotation module. For example, the modulation selector 44 may specify an about of phase rotation to be applied to a tone grouping, whether to apply a complex conjugate to a tone grouping.

The modulation selector 44 may select a modulation function resulting in the complex conjugation of a modulated tone grouping based, at least in part, on one or more criteria. The criteria may include a measure of the content of the data word 25 being processed and/or the tone groupings formed from the data word 25, the noise content and capacity of one more channels between the antenna 70 and a receiver, just to name a few examples.

Accordingly, the embodiment of FIG. 2 can be configured to modulate a data word in the following manner. To describe the generalized operation of modulator 40, let C indicate a first data word, such as data word 25 of FIG. 1.

$$C=[1, 1, 0, 1, \ldots, 1, 0, 0, 1, \ldots],$$

which can be divided into tone groupings such as:

$$(c_k^q, \ldots, c_{k+(K-1)D}^q)$$

where for a first data word, q=1 and so on.

Additionally, for a first tone grouping of the data word, k=1 to designate the first bit position of the tone grouping. In this example, the subscripts "k" and "k+(K−1)D" correspond to different bit positions separated by the bit distance "D". The variable "K" provides an additional degree of freedom in selecting the bit distance between adjacent bit pairs of the tone grouping.

Applying a first modulation function (m_1) to a tone grouping is represented by:

$$x_k^q = m\_1(c_k^q, \ldots, c_{k+(K-1)D}^q)$$

In a similar manner, a second modulation function (m_2) may also be applied to the tone grouping $(c_k^q, \ldots, c_{k+(K-1)D}^q)$, represented by:

$$x_k^q = m\_2(c_k^q, \ldots, c_{k+(K-1)D}^q)$$

Similarly, additional modulation functions can be applied to the tone grouping $(c_k^q, \ldots, c_{k+(K-1)D}^q)$, as represented by:

$$x_{k+(M-1)L}^q = m\_M(c_k^q, \ldots, c_{k+(K-1)D}^q)$$

where m_M indicates the "Mth" modulation function. The subscript "L" provides an indication of the number of tone groupings parsed from C.

Accordingly, in a modulation domain, the resulting modulated signal representing data word C may be expressed as:

$$|y_k^q, \ldots, y_{k+(M-1)L}^q| = |f(x_k^q), \ldots, f(x_{k+(M-1)L}^q)|$$

where $y_k$ through $y_{k+(M-1)}$ represents modulated signals as functions of modulation techniques, represented by $f(x_k)$ through $f(x_{k+(M-1)L})$ applied to the tone grouping of C.

Additionally, after applying a rotational matrix given by Q in modulation domain, $$(d_k^q, \ldots, d_{k+(M-1)L}^q) = Q(y_k^q, \ldots, y_{k+(M-1)L}^q)$$

Thus, in an example in which a rotation matrix is applied to the modulated data word, the concatenated phase rotated stream in the modulation domain can be expressed as:

$$\left( d_0^q, d_1^q, \ldots, d_{\frac{N}{2}}^q, d_{\frac{N}{2}+1}^q, \ldots \right),$$

in which N indicates the length of data word C.

Figure 3:
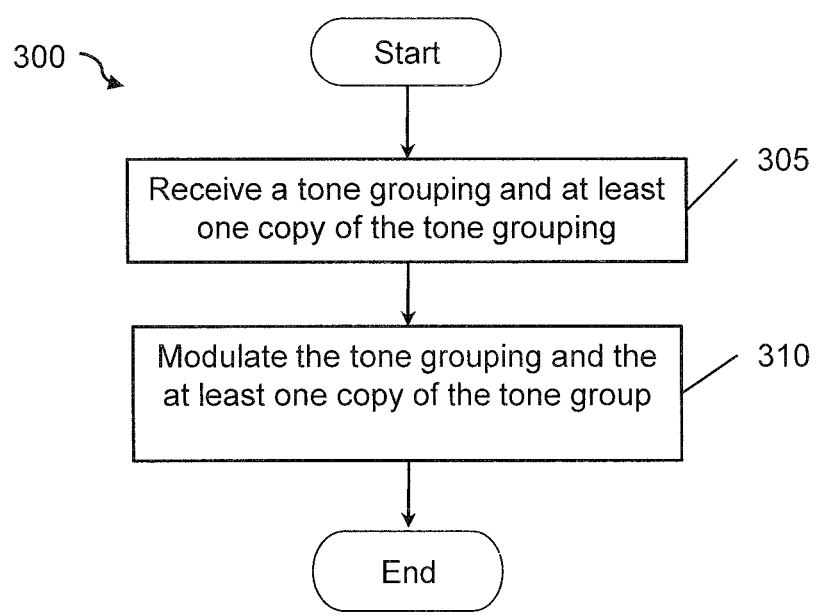
FIG. 3 illustrates one embodiment of a method associated with phase-rotated tone-grouping modulation.

FIG. 3 illustrates one embodiment of a method associated with phase-rotated tone-grouping modulation. Method 300 is discussed with reference to the apparatus 100 shown in FIG. 1, although the method 300 may be performed with other devices having different configurations.

At 305, the method begins where a tone grouping and at least one copy of the tone grouping are received by a modulator. At 310, the tone grouping is modulated using a first modulation function, and the at least one copy of the tone grouping is modulated using a second modulation function that is different from the first modulation function.

In some embodiments, the method 300 may include other actions as discussed with reference to FIG. 1 and apparatus 100. For example, to form the tone grouping by the modulator, the method parses a grouping of binary digits in a data word to form the tone grouping. In one embodiment, the parsing includes repositioning bits in the data word to form the tone grouping and also form a copy of the tone grouping.

In another embodiment, the method 300 may further include pairing a first bit of a data word with a second bit of the data word, wherein the first bit and the second bit are separated by a first bit distance. The method may also pair a third bit and a fourth bit, where the third bit and the fourth bit are separated by a second bit distance and where the first bit distance and the second bit distance may be different. In another embodiment, the tone grouping or the at least one copy of the tone grouping may be rotated in phase. In an example, a phase rotation of the tone grouping may form a complex conjugate of the tone grouping.

With the present systems and methods, processing and transmitting signals may be improved by phase rotation and tone grouping. Signals modulated by these techniques exhibit a lower peak-to-average power ratio, which thereby enables systems used for transmitting or receiving such signals to reduce dynamic range requirements while achieving the benefits of phase-domain diversity. This results in more reliable transmission and reception of signals used in wireless transmission systems.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   a parser configured to reposition bits of a data word by pairing at least two of the bits together that are separated by at least one other bit;
   an encoder configured to, from the repositioned bits, form i) a tone grouping and ii) a copy of the tone grouping;
   a modulator configured to modulate the tone grouping and the copy of the tone grouping; and
   a phase rotation module configured to apply a rotation function to the modulated copy of the tone grouping to rotate a phase of the copy of the tone grouping.

2. The apparatus of claim 1, wherein the parser is configured to reposition the bits to form bit pairs in the data word with bits that were previously separated by a bit distance greater than 1.

3. The apparatus of claim 1, wherein the parser is configured to:
   reposition a first bit pair of the data word separated by a first bit distance that is at least one bit, and
   reposition a second bit pair of the data word separated by a second bit distance that is at least one bit,
   wherein the first bit distance is different from the second bit distance.

4. The apparatus of claim 1, wherein the phase rotation module is further configured to receive a control signal that, at least in part, results in a selection of a parameter of the phase rotation module.

5. The apparatus of claim 1, wherein the phase rotation module is further configured to apply a complex conjugate to the modulated copy of the tone grouping.

6. An apparatus, comprising:
   a parser configured to reposition bits of a data word by pairing at least two of the bits together that are separated by at least one other bit;
   an encoder configured to, from the repositioned bits, form i) a tone grouping and ii) a copy of the tone grouping;
   a modulator configured to modulate the tone grouping and the copy of the tone grouping, wherein the modulator is further configured to:
   modulate the tone grouping using a first modulation function; and
   modulate the copy of the tone grouping using a second modulation function that is different from the first modulation function.

7. A method, comprising:
   repositioning bits of a data word by pairing at least two of the bits together that are separated by at least one other bit;
   from the repositioned bits, forming i) a tone grouping and ii) a copy of the tone grouping; and
   modulating the tone grouping and the copy of the tone grouping, wherein the modulating comprises:
   modulating the tone grouping using a first modulation function; and modulating the copy of the tone grouping using a second modulation function, wherein the second modulation function is different from the first modulation function.

8. A method, comprising:
repositioning bits of a data word by pairing at least two of the bits together that are separated by at least one other bit;
from the repositioned bits, forming i) a tone grouping and ii) a copy of the tone grouping;
modulating the tone grouping and the copy of the tone grouping; and
rotating i) a phase of the tone grouping or ii) a phase of the copy of the tone grouping after modulating the tone grouping and the copy of the tone grouping.

9. The method of claim 8, wherein the repositioning includes parsing the data word, wherein the parsing further comprises:
pairing a first bit with a second bit, the first bit and the second bit being separated by a first bit distance that is at least one bit; and
pairing a third bit with a fourth bit, the third bit and the fourth bit being separated by a second bit distance that is at least one bit;
wherein the first bit distance is different from the second bit distance.

10. The method of claim 8, further comprising:
applying i) a complex conjugate to the tone grouping or ii) a complex conjugate to the copy of the tone grouping.

11. The method of claim and 8, further comprising:
selecting, based, at least in part, on a quality of a communications channel, at least one of a first modulation function and a second modulation function.

12. A device, comprising:
a parser configured to reposition bits of a data word to generate i) a tone grouping and ii) a copy of the tone grouping;
a modulator configured to modulate i) the tone grouping and ii) the copy of the tone grouping; and
wherein the modulator is further configured to:
modulate the tone grouping using a first modulation function, and
modulate the copy of the tone grouping using a second modulation function that is different than the first modulation function.

13. The device of claim 12, wherein the modulator is further configured to apply a phase rotation function to the copy of the tone grouping.

14. The device of claim 13, wherein the phase rotation function is configured to apply a complex conjugate to the first modulation function.

15. The device of claim 12, further comprising a modulation selector configured to select between the first modulation function and the second modulation function.

16. The device claim 12, wherein the first modulation function is configured to apply quadrature phase shift keying modulation, and wherein the second modulation function is configured to apply quadrature amplitude modulation.

17. The device of claim 12, further comprising a modulation selector configured to apply at least one of the first modulation function or the second modulation function based, at least in part, on detected characteristics of a communications channel.

18. The device of claim 12, wherein the parser is configured to:
select bits of a first bit pair of the tone grouping using bits of the data word separated by a first bit distance that is at least one bit; and
select bits of a second bit pair of the tone grouping using bits of the data word separated by a second bit distance that is at least one bit,
wherein the first bit distance is not equal to the second bit distance.

* * * * *